June 21, 1949.  N. CHIRELSTEIN  2,473,570
METHOD OF MANUFACTURING ATTACHMENT PLUGS
Filed Jan. 22, 1946  2 Sheets-Sheet 1
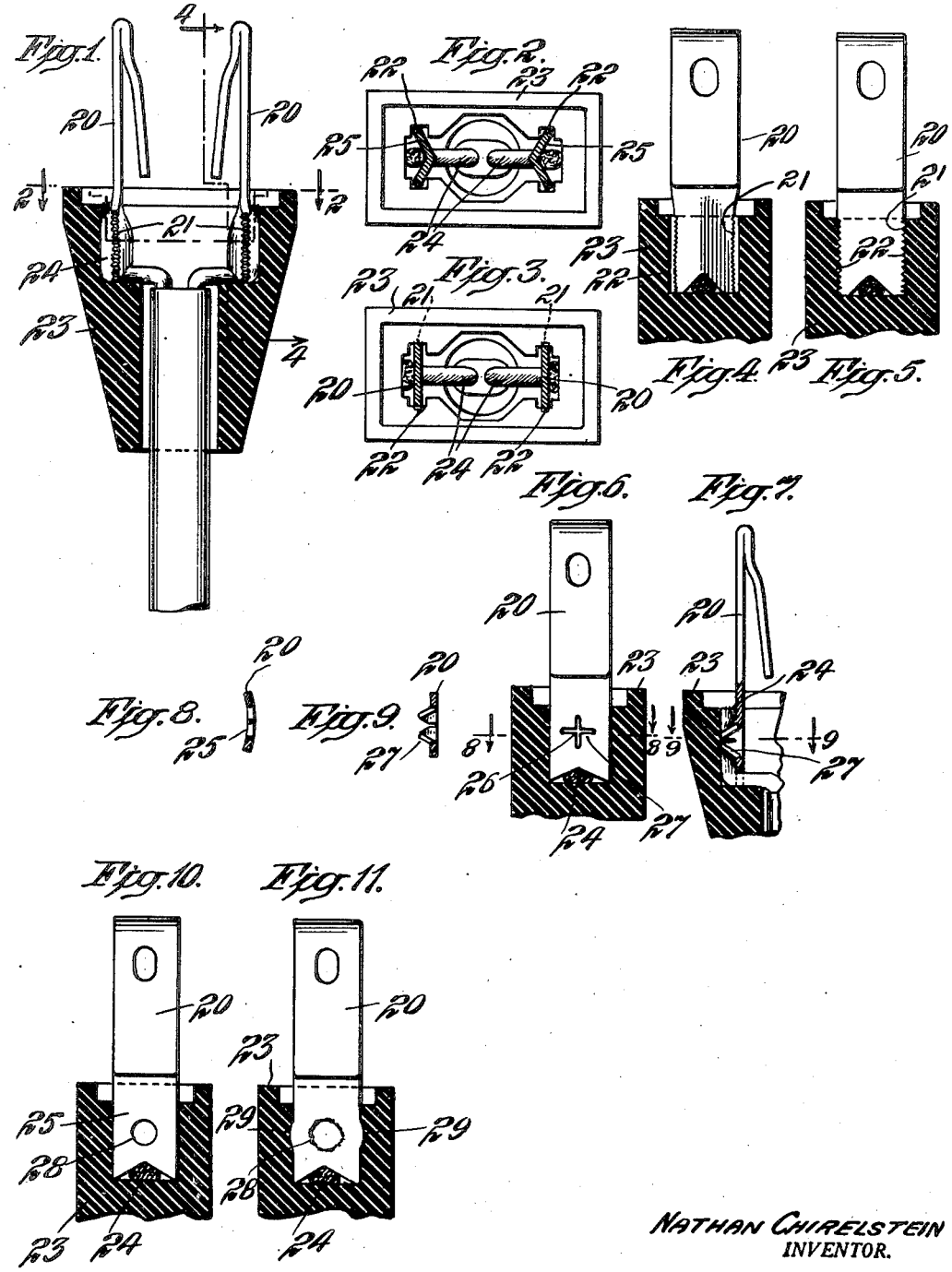
NATHAN CHIRELSTEIN
INVENTOR.
BY Philip S. McBean
ATTORNEY

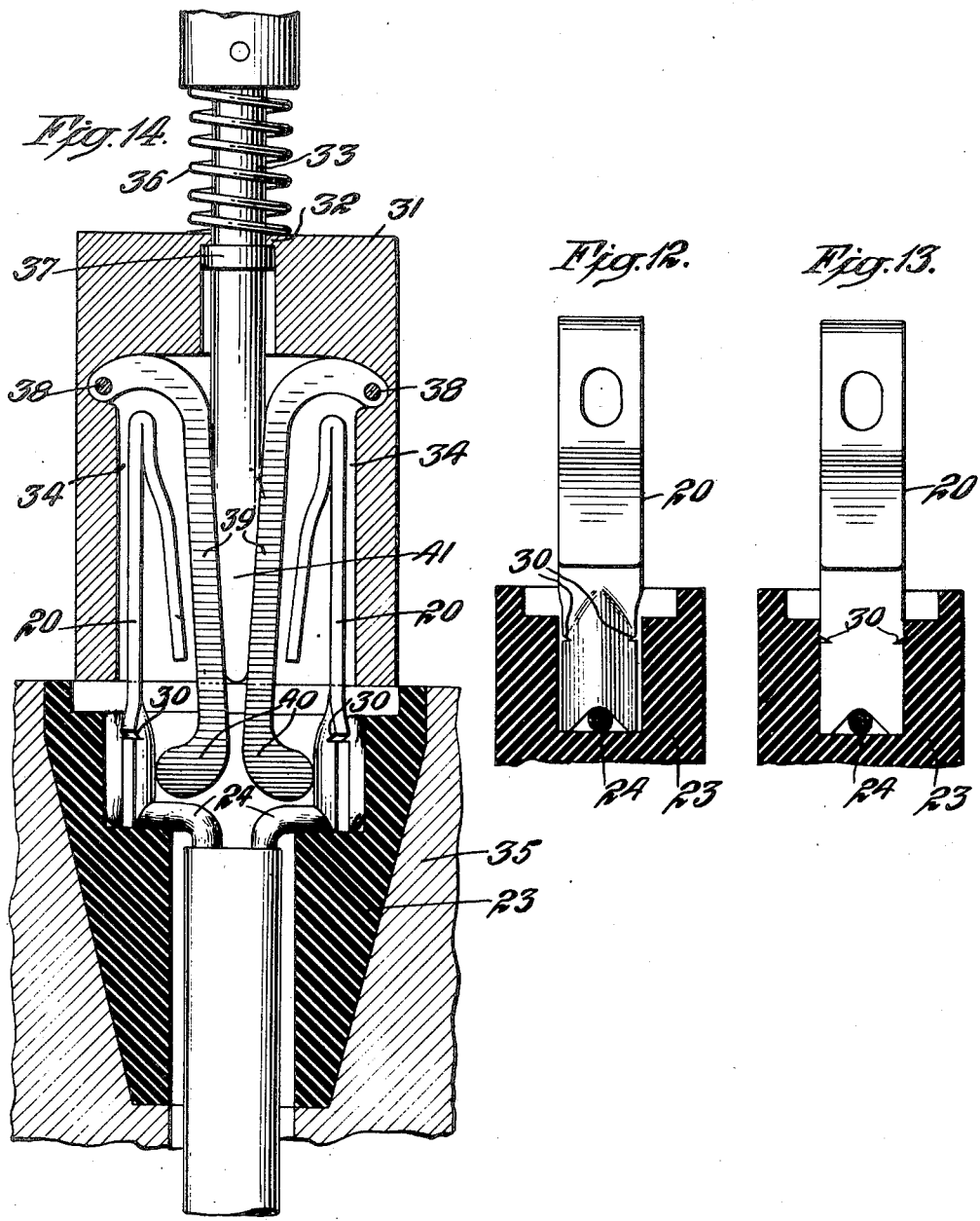

Patented June 21, 1949

2,473,570

UNITED STATES PATENT OFFICE 2,473,570

METHOD OF MANUFACTURING ATTACHMENT PLUGS

Nathan Chirelstein, Maplewood, N. J.

Application January 22, 1946, Serial No. 642,729

3 Claims. (Cl. 29—155.55)

The invention here disclosed relates to electrical devices in the nature of attachment plugs.

Special objects of the invention are to provide a device of this character in which the parts, that is, wires, contact blades and cap or plug body, will be securely held together by reason of their own interengagement, without screws, rivets, solder or other forms of fastenings.

In prior constructions the blades have been driven into their seats in the plug bodies over the wires and such constructions have been practical where the plug bodies were of rubber or nonfrangible material and so would expand with the driving of oversize or barbed contact blades and then contract over the barbs or oversize portions to lock the blades and wires in place.

With plug bodies of frangible hard surfaced material, such constructions have not been entirely practical because the driving of the oversize blades would crack, split, chip or break the body of the plug, the projecting barbs would be bent back by the hard surfaced material and made practically useless or, if the barbs actually cut the material the action was merely one of scraping or scratching, leaving the blades less than positively or firmly anchored.

Objects of the present invention are to avoid the difficulties and shortcomings mentioned and to provide a construction in which the parts of the plug can be assembled without driving or forcing them together and in which they will be firmly and positively secured after assembly.

The foregoing and other desirable objects are attained by novel features of construction, combinations and relations of parts, all as hereinafter defined in the specification and broadly covered in the claims.

In the accompanying drawings several embodiments of the invention are illustrated, together with a method and means of assembly, but it is contemplated that changes and modification may be resorted to without departure from the true spirit and broad scope of the invention as hereinafter defined and claimed.

Fig. 1 in the drawings is a broken part sectional view showing the parts of one of the plugs as loosely assembled and ready to be finally secured;

Fig. 2 is a cross sectional view as on the plane of line 2—2 of Fig. 1, showing the blades loose in their seats, ready to be made fast to the plug body;

Fig. 3 is a similar view showing the blades expanded and interlocked with the cap and wire ends;

Figs. 4 and 5 are views on substantially the plane of line 4—4 of Fig. 1, showing the blade in its loose, non-expanded and in its spread or expanded conditions, respectively;

Figs. 6 and 7 are broken part sectional details of another embodiment of the plug blade in non-expanded and in expanded conditions, respectively;

Figs. 8 and 9 are cross sectional details of the blade as on substantially the planes of lines 8—8 and 9—9, respectively, of Figs. 6 and 7;

Figs. 10 and 11 are broken sectional details of another embodiment showing the blade in the non-expanded and in the expanded conditions, respectively;

Figs. 12 and 13 are similar views of another form of the invention;

Fig. 14 is a broken sectional view showing a form of apparatus for accomplishing the assembling and expanding operations.

In the form of the invention first shown, Figs. 1 to 5, the contact blades 20 are made with barbed or serrated edges 21. These anchorage portions of the blades, however, are of less cross sectional dimensions than the seats 22 provided for them in the plug base 23 so that, as indicated in Figs. 1, 2 and 4, they will simply drop into place, without need for being driven or forced. This avoids any possibility of straining or cracking the material of the cap.

After being located in the seats or slots provided for them, over the wire ends 24, the inserted portions of the blades are expanded and caused to bite or grip into the cap material, transversely of the direction of pull or strain on the blades and guard.

Figs. 2 and 3 in particular show how this is accomplished in the first illustrated embodiment, by giving the toothed end portions of the blades a transverse curvature or angulation 25 which reduces the overall cross section to less than that of the seats 22, and by then flattening and breaking down such transverse curvature or angulation, to spread and expand these portions and thus to cause the teeth along the edges to bite transversely into the side walls of the cavities 22, as in Figs. 3 and 5.

In Figs. 6 and 7 the blades are bent transversely at 25 and in addition are cross slotted as indicated at 26, to provide points or spurs 27 which with the expansion and flattening will bite through the wire into engagement with the back wall of the contact seat 22, Fig. 7. In this case the tool or mechanism which accomplishes the flattening may have a cone or projection to force the spurs 27 out beyond the flattened plane of the expanded contact.

Figs. 10 and 11 illustrate another embodiment in which the transversely bowed and foreshortened portion of the blade is perforated at 28 and in which the expanding tool enters this perforation to spread the material and bulge the edges of the material into gripping engagement with the walls of the cavity, as indicated in a more or less exaggerated manner at 29 in Fig. 11.

In the form of the invention shown in Figs. 12 and 13, the side edges of the blade are slit inwardly as indicated at 30, so that in the flattening and expanding operations the slit portions will be caused to project or protrude as sharp corners which will bite to some extent into the side walls of the cavity.

Fig. 14 illustrates a simple form of apparatus for accomplishing the assembling and expanding operations and consisting of a head 31 slidably mounted at 32 on the spindle or arbor 33 of a press and containing cavities 34 for positioning the contact blades and carrying them to their seats in the plug cap. The latter is shown as supported in a nest 35 in the base of the machine.

A spring 36 on the spindle normally holds the head 31 projected against a shoulder 37.

Pivoted at 38 within the head are a pair of spreader levers 39 having projecting ends 40 disposed to bear against the convexed end portions of the blades.

The spindle is shown as having a tapered, wedge-like end portion 41 entered between the levers 39 to force them apart as the spindle continues its motion, permitted by spring 36, after the head 31 is stopped by engagement with the bed of the machine.

By disposing the blades with the transversely buckled portions opposite and then simultaneously flattening and spreading these portions, pressure on the cap body is balanced and distributed in opposite directions, thus to relieve the material of undue or excess pressure in any one direction. Also, because of the external support provided at such time the cap body, even though of relatively light construction, is fully capable of withstanding the momentary pressure developed in the expanding operation.

The transversely bowed portions, in flattening out, scrape over the wire ends 24 with the effect of cutting away any insulation, thus insuring good, firm, clean electrical connection with the wires. The teeth, spurs or cuts in the edges of the blades, not being dulled by having been driven in over the walls of the cavity, are sharp and present keen cutting edges to bite into the confining walls. With teeth or shoulders cut across the edges of the blades as in Figs. 2 and 12, cutting edges are provided which are disposed edgewise to the surface which is to be cut into. In other words, these cutting edges are set the same as the edge of a cutting tool, such as a parting tool on a lathe, so as to present a cutting point to the face of the material. Even though these cutting points be dulled to some extent in their cutting action, they will nevertheless cut somewhat, transversely into the material and thereby lock the embedded portions of the blades in the cap body. In flattening, the arched, bowed or buckled portion acts like a spreader toggle. This is particularly true in a case like that illustrated in Fig. 2 where the blade is bowed at the center to form angularly related sides which in flattening out as in Fig. 3 will exert a decided spreading action with the two angled sides, hinging along the center line of the bend. The transverse engagement of the blades in the material locks the blades with the effect of interlocking shoulders disposed transversely of any longitudinal pull on the blades. This interlocking effect may be equivalent to that obtained by provision of transverse, undercut shoulders in the cap body and without the complication of providing such undercut shoulders by molding operations or the like. By reducing the root portions of the blades to undersize dimensions, the blades can be easily entered in the cavities by hand, since no driving force or machine pressure is required.

While the inner ends of the blades are shown as notched to engage over the wires, it is contemplated that they may be blunt ended, pointed or serrated to bind, pierce or otherwise bite through any insulation and firmly and positively connect with the wire.

What is claimed is:

1. The herein disclosed method of manufacturing electrical attachment plugs which comprises providing an insulating cap having a central cord passage and longitudinally extending blade receiving seats at opposite sides of the same and contact blades having straight, flat end portions of greater transverse width than the transverse width of said seats, transversely buckling said greater-width end portions of the blades to less overall transverse width than the transverse width of said seats, entering said transversely reduced buckled end portions of two blades loosely in said seats with the transversely buckled portions of the same in opposition and then applying a spreading force between and simultaneously to said oppositely disposed bowed portions to flatten and thereby spread said bowed portions to substantially the original flat width with the edges transversely gripping the transverse edges of the seats.

2. The method of claim 1 including the step of transversely notching the edges of the portions which are bowed, inwardly from the ends of such portions to segregate the bowed portions from the balance of the blade and to provide cut edges which will bite transversely into the walls of the seats when the spreading force is applied to the bowed portions as described.

3. The method of claim 1 including the further step of striking sharp pointed spurs laterally out of the bowed portions in the simultaneous spreading and flattening operation to form at the same time lateral wire penetrating points.

NATHAN CHIRELSTEIN.

REFERENCES CITED

The following references are of record in the file of this patent:

UNITED STATES PATENTS

| Number | Name | Date |
|---|---|---|
| 417,446 | Sands | Dec. 17, 1889 |
| 801,683 | Penfold | Oct. 10, 1905 |
| 1,742,044 | Meldrum | Dec. 31, 1929 |
| 2,049,585 | Gunthorp | Aug. 4, 1936 |
| 2,110,035 | Chirelstein | Mar. 1, 1938 |
| 2,231,289 | Judisch et al. | Feb. 11, 1941 |